US006283777B1

(12) United States Patent
Canova et al.

(10) Patent No.: US 6,283,777 B1
(45) Date of Patent: *Sep. 4, 2001

(54) DUAL STYLE CONNECTOR FOR HANDHELD COMPUTER

(75) Inventors: Francis J. Canova, Fremont; Madeleine L. Francavilla, Santa Cruz; Amy A. Han; Traci A. Neist, both of Palo Alto; Robert G. Twiss, Portola Valley; Dennis J. Boyle, Palo Alto, all of CA (US)

(73) Assignee: Palm, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,886

(22) Filed: May 26, 1999

(51) Int. Cl.[7] .................................................. H01R 27/00
(52) U.S. Cl. .......................................... 439/218; 361/686
(58) Field of Search .................................. 439/218, 217, 439/222, 223, 660, 929; 361/686, 683, 726, 740, 66

(56) References Cited

U.S. PATENT DOCUMENTS

| D. 416,001 | * | 11/1999 | Tal et al. | D14/100 |
|---|---|---|---|---|
| 3,744,034 | | 7/1973 | Paul | 340/172.5 |
| 4,613,196 | * | 9/1986 | Foerster | 439/404 |
| 4,740,167 | * | 4/1988 | Millhimes et al. | 439/92 |
| 4,860,372 | | 8/1989 | Kuzunuki et al. | 382/13 |
| 4,972,496 | | 11/1990 | Sklarew | 382/13 |
| 5,030,902 | * | 7/1991 | Mattinger et al. | 320/2 |
| 5,052,943 | * | 10/1991 | Davis | 439/357 |
| 5,220,270 | * | 6/1993 | Peickert | 320/2 |
| 5,231,381 | | 7/1993 | Duwaer | 345/174 |
| 5,305,394 | | 4/1994 | Tanaka | 382/13 |
| 5,306,196 | * | 4/1994 | Hashiguchi | 439/607 |

(List continued on next page.)

FOREIGN PATENT DOCUMENTS

WO 97/18602  5/1997 (WO).

OTHER PUBLICATIONS

Gray, R. et al., "Efficient MC68HC08 programming: reducing cycle count and improving code density", *Dr. Dobb's Journal*, vol. 20, No. 5, May 1995, pp. 70–75.
Ruley, J. et al., "Handheld–to–Handheld Combat", *Windows Magazine*, No. 811, p. 55, Nov. 1997.
Dayton, D., "FRx extends reporting power of Plantinum Series", *PC Week*, vol. 8, No. 5, p. 29(2), Feb. 1991.
Forbes, J. et al., "Palm PCs get a Big Hand (What's Hot)", *Windows Magazine*, No. 905, p. 96, May 1998.
Penwarden, M., "More Muscle for HP's OmniBook", *Windows Magazine*, No. 501, p.110, Jan. 1994.
Feigel, C., "IBM, Motorola preview embedded PowerPCs; 403 and 505 processors combine strong performance with low cost", *Microprocessor Report*, vol. 8, No. 6, pp. 1–5, May 1994.
Bursky, D., "Evolving DSP chips do more", *Electronic Design*, vol. 38, No. 23, pp. 51–59, Dec. 1990.

*Primary Examiner*—Brian Sircus
*Assistant Examiner*—Son V. Nguyen
(74) *Attorney, Agent, or Firm*—Van Mahamedi; Hickman Palermo Truong & Becker LLP (57) ABSTRACT

Embodiments of this invention provide for a versatile connector that is capable of receiving any one of two types of connectors. The connector is preferably positioned on a bottom edge of a handheld computer to receive either pogo style or wiping style connectors. As a result, the connector enables the handheld computer to connect with accessory devices that use either style connectors. In particular, the handheld computer can connect with communication cradles using wiping style connectors, or smaller accessory devices that use pogo style connectors.

8 Claims, 6 Drawing Sheets

U.S. PATENT DOCUMENTS

| | | | | |
|---|---|---|---|---|
| 5,354,216 | * | 10/1994 | Cruise et al. | 439/553 |
| 5,387,110 | * | 2/1995 | Kantner et al. | 439/59 |
| 5,389,745 | | 2/1995 | Sakamoto | 178/18 |
| 5,411,405 | | 5/1995 | McDaniels et al. | 439/131 |
| 5,415,570 | * | 5/1995 | Sarkissian | 439/676 |
| 5,434,929 | | 7/1995 | Beernink et al. | 382/187 |
| 5,440,449 | | 8/1995 | Scheer | 361/686 |
| 5,444,192 | | 8/1995 | Shetye et al. | 178/18 |
| 5,452,371 | | 9/1995 | Bozinovic et al. | 382/187 |
| 5,459,637 | | 10/1995 | Ma et al. | 361/686 |
| 5,528,743 | | 6/1996 | Tou et al. | 707/541 |
| 5,534,892 | | 7/1996 | Tagawa | 345/173 |
| 5,576,530 | * | 11/1996 | Hagerty | 235/472 |
| 5,615,284 | | 3/1997 | Rhyne et al. | 382/187 |
| 5,621,817 | | 4/1997 | Bozinovic et al. | 382/189 |
| 5,630,148 | | 5/1997 | Norris | 713/322 |
| 5,698,822 | | 12/1997 | Haneda et al. | 178/18 |
| 5,770,330 | * | 6/1998 | Castaneda et al. | 429/123 |
| 5,816,826 | | 10/1998 | Colemen | 439/64 |
| 5,841,901 | | 11/1998 | Arai et al. | 382/187 |
| 5,941,648 | * | 8/1999 | Robinson et al. | 400/82 |
| 5,993,231 | * | 9/2000 | Hoolhorst | 439/218 |
| 5,999,400 | * | 12/1999 | Belopolsky et al. | 361/600 |
| 6,086,403 | * | 7/2000 | Po et al. | 439/374 |
| 6,115,248 | * | 9/2000 | Canova et al. | 361/686 |

* cited by examiner

DUAL STYLE CONNECTOR FOR HANDHELD COMPUTER

BACKGROUND OF THE INVENTION

1. Field of the Invention

This invention pertains to connectors for connecting computing devices. In particular, embodiments of this invention encompass a connector for coupling a handheld computer to an accessory device using anyone of at least two connector styles.

2. Description of the Related Art

Handheld computers may be coupled to peripheral or accessory devices to enhance their abilities and functions. Typical accessory devices for handheld computers include communication cradles or docking stations, battery chargers, Universal Serial Bus (USB) devices, and modems. Generally, these devices are adapted to mate with the handheld computer using either wiping style connectors or pogo style connectors.

Accessory devices that employ a wiping style connector have a number of spring-biased contacts that are spaced apart and parallel to one another. The plurality of spring-biased contacts are then positioned on the accessory device to contact and wipe across a corresponding mating surface of the handheld computer. The handheld computer may then be positioned to slide across a surface of the accessory device containing the wiping style connector in order to establish electrical contact. Typically, the wiping style connectors are contained on a surface of the accessory device that is adapted to be retained against the handheld computer. Examples of such accessory devices include communication cradles or docking stations which position the wiping style connector parallel to a face of the handheld computer that retains the corresponding contact surface. A specific example of a handheld computer that is adapted to mate with an accessory device in this manner is the Palm III™ organizer, manufactured by the 3Com Corp.

Other accessory devices employ pogo style connectors which secure mechanically to the handheld computer while providing a plurality of pogo pins to establish electrical contact with the handheld computer. The pins are biased and protrude normally to contact the contact surface of the handheld computer. Pogo pin connectors are sometimes used with smaller accessory devices which plug into an output port of the handheld computer, typically at or near a bottom edge of the handheld computer.

Until now, handheld computers were adapted to connect with accessory devices having either one or the other type of connector. This limited handheld computers and accessory devices to incorporating a particular connector type or architecture. Consequently, accessory devices were designed around the type of connector being employed, rather than the type of connector best suited for the particular device.

Therefore, there is a need for a connector that enables the handheld computer to mate with either wiping style or pogo style connectors on an accessory device.

SUMMARY OF THE INVENTION

Embodiments of this invention provide for a versatile connector that is capable of receiving any one of at least two types of connectors. The connector is preferably positioned on a bottom edge of a handheld computer to receive either pogo style or wiping style connectors. As a result, the connector enables the handheld computer to connect with accessory devices that use either style connectors. In particular, the handheld computer can connect with communication cradles using wiping style connectors, or smaller accessory devices that use pogo style connectors.

DETAILED DESCRIPTION

Embodiments of this invention provide a versatile connector for use with portable computers, and in particular, handheld computers. In an embodiment, a connector is positioned near or at an edge of the handheld computer and provides a first contact surface that is parallel to a back face of the handheld computer, and a second contact surface that is perpendicular or acute with respect to the first contacts surface and the back face. The first contact surface enables the handheld computer to mate with wiping style connectors, typically found on accessory devices such as communication cradles. The second contact surface enables the handheld computer to connect with pogo style connectors, which may be associated with more portable accessory devices such as travel chargers.

Figures 1A, 1B:
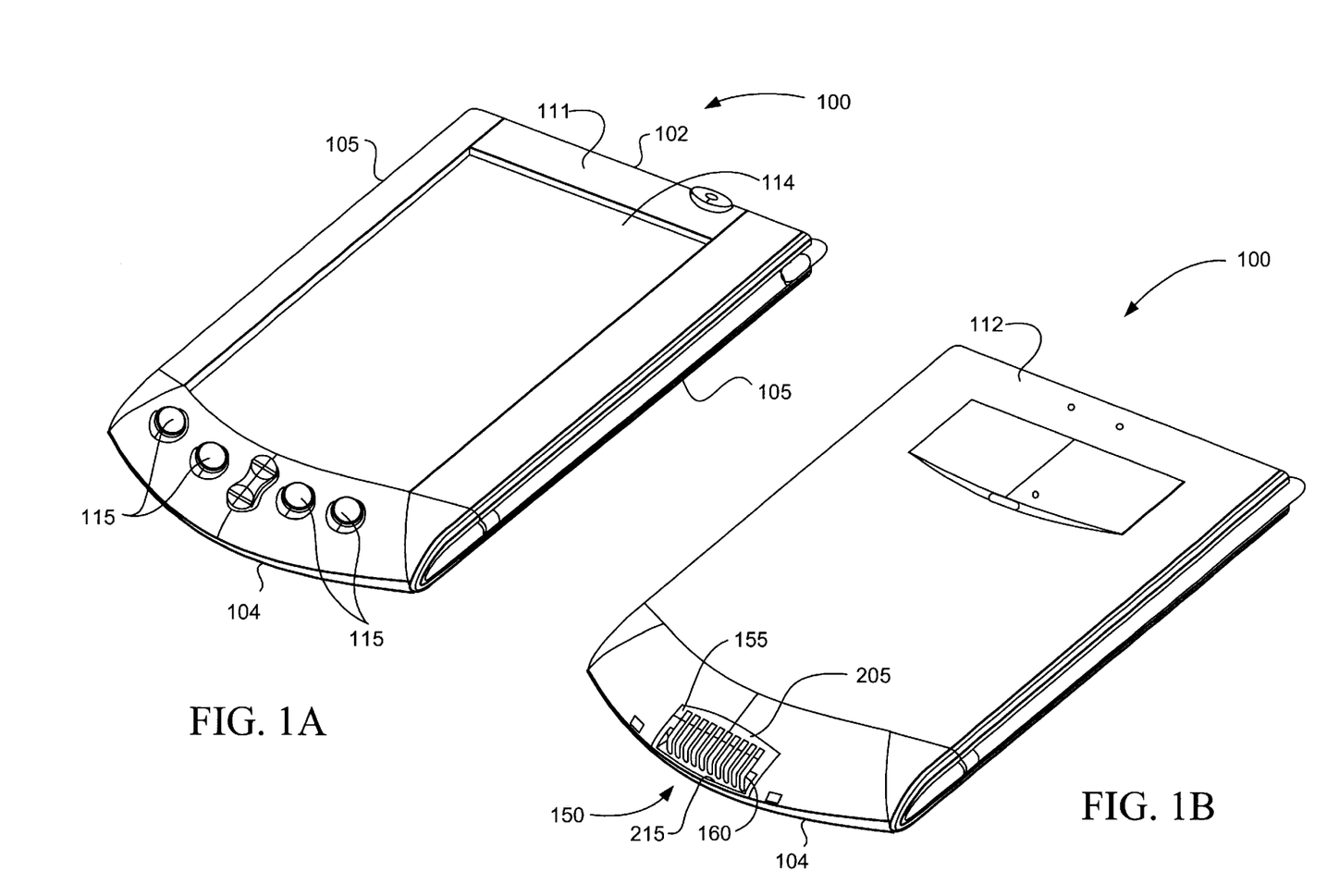
FIG. 1A is an isometric frontal view of a handheld computer incorporating an embodiment of this invention.
FIG. 1B is an isometric back view of the handheld computer of FIG. 1.

FIGS. 1A and 1B depict a handheld computer 100 incorporating a connector 110 under an embodiment of this invention. The handheld computer 100 may include palm style computers such as a PalmPilot™, Palm III™, or Palm V™ organizers, manufactured by the 3Com Corporation. Other embodiments of the invention can include Windows CE™ handheld computers, or other handheld computers and personal digital assistants.

FIG. 1A is a frontal view of the handheld computer 100 incorporating embodiments of this invention. Preferably, the handheld computer 100 has interactive hardware and software that perform functions such as maintaining calendars and phone lists. The handheld computer 100 includes a top and bottom edge 102, 104, and a pair of opposing lateral sides 105. A front face 111 of the handheld computer 100 includes a plurality of input functions keys 115 and a display 114 having graphic user interface features. The handheld computer 100 may communicate with a network such as the Internet, or desktop computers through one or more ports. The handheld computer 100 may include, for example, an infra-red (IR) port (not shown), and an output port (FIG. 1B) that incorporates a connector 150 of this invention.

With reference to FIG. 1B, the connector 150 is preferably positioned at the bottom edge 104 of the handheld computer 100. The position of the connector 150 at the bottom edge 104 facilitates receiving connectors of accessory devices in two or more directions to mate with the handheld computer 100. The connector 150 of the output port includes a plurality of contact elements 160 contained in an insulative body 155. The insulative body 155 provides insulative material between the individual contact elements 160.

Preferably, the insulative body 155 is shaped to include an elevated surface 205 and a base surface 210. The insulative body 155 includes a plurality of spaced-apart extensions 215 that extend toward the bottom edge 104 from the elevated surface 205 and over the base surface 210. In an embodiment, the extensions 215 are spaced apart to insulate individual contact elements 160 located between adjacent pairs of extensions.

The contact elements 160 adapt the connector 150 to mate with two different kinds of connectors. Each contact element 160 has a vertical and horizontal contact dimension with respect to a back face 112 of the handheld computer 100. In an embodiment, each of the contact elements 160 include a horizontal contact dimension for mating with a wiping style connector and a vertical contact dimension for mating with a pogo-style. As a result, the connector 150 may mate with, for example, a communication cradle 400 (shown in FIGS. 4A and 4B) which has a wiping style connector, or relatively smaller accessory devices that may have pogo style connectors (shown in FIG. 3).

Figure 2A:
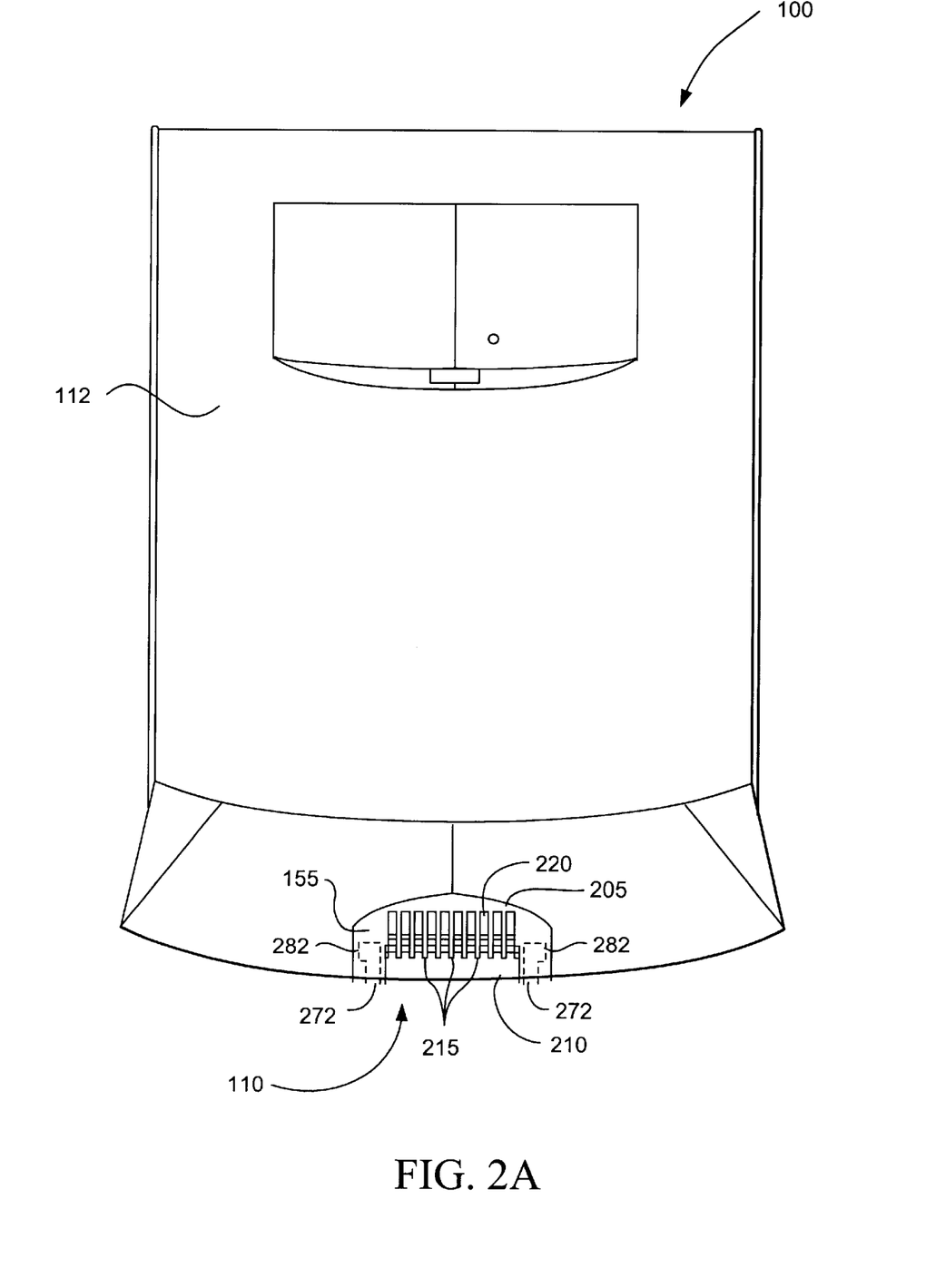
FIG. 2A is a back view of the handheld computer showing details of an embodiment of a connector under this invention.

FIG. 2A illustrates the back face 112 of the handheld computer 100. Preferably, the insulative body 155 is integrated with the bottom edge of the handheld computer 100 and retains the contact elements a short distance from the bottom edge 104. FIG. 2A shows that each contact element includes a top contact surface 220 that is substantially planar with the back face 112 and a bottom contact surface 250 that is perpendicular with respect to the top contact surface 220. The top contact surfaces 220 extend into a back portion of the insulative body 155 distal to the bottom edge 104. Preferably, each of the top contact surfaces 220 connect with or form into a lead of a printed circuit board embedded within the handheld computer 100. The orientation of the top contact surface 220 with respect to the back face 112, as well as the planar shape and dimension of the top contact surfaces facilitates the connector 150 in mating with wiping style connector elements.

Figure 2B:
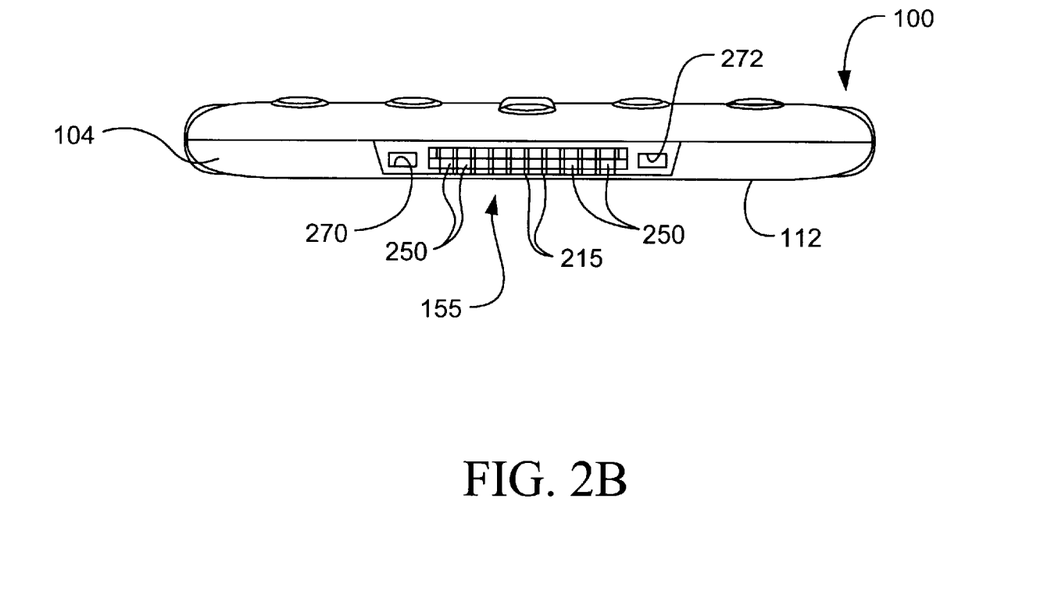
FIG. 2B is a view of a bottom edge of the handheld computer in FIG. 2A.

FIG. 2B shows each of the contact elements disposed between the extensions 215 to include the bottom contact surface 250 that forms the vertical portion of the respective contact element 160. The bottom contact surface 250 is preferably planar and extends to the base surface 215 of the insulative body 155 in a perpendicular direction. The orientation of the bottom contact surface 250, as well as the dimension and shape of the bottom contact surface, facilitates the connector 150 in mating with pogo style connectors (shown in FIG. 3). Preferably, the connector 150 includes ten contact elements, including a parity bit and eight bits of data. The extensions 215 serve to insulate the individual conductive elements positioned between adjacent pairs of extensions. It should be noted that while the extensions 215 are effective in isolating individual contact elements 260, other embodiments may provide alternative configurations or components for retaining the individual conductive elements 160.

Figure 3:
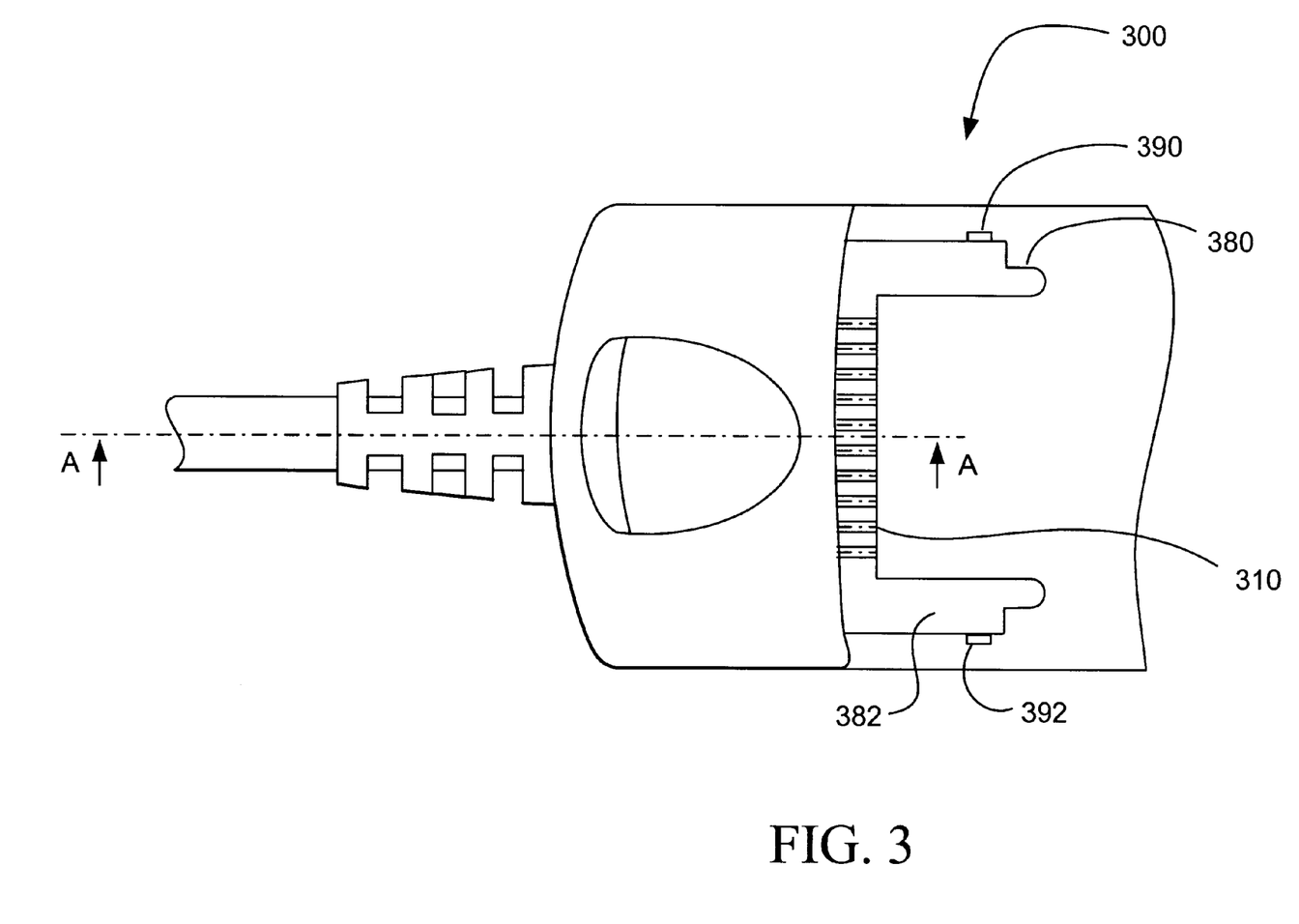
FIG. 3 is a top view of a pogo connector used to couple with an embodiment of this invention.

FIGS. 2A and 2B further shows the output port to include a pair of opening 270, 272 for receiving a mechanical coupling of a pogo style connector (FIG. 3). The opening 270, 272 are formed in the insulative body 155 on each lateral side of the combination of contact elements 160. The opening 270, 272 are adapted to receive and secure a pogo style connector 300 (FIG. 3) that mates with the connector 150. Preferably, each of the opening 270, 272 includes a respective stop portion 280, 282. The stop portions 280, 282 are recesses in the openings 270, 272 that allow a pair of engagement members 380, 382 of the pogo connector 300 to release spring-biased levers 390, 392 that lock on to the stop portions 280, 282 of the connector 150. In this way, the openings 270, 272 serve to securely retain the pogo style connector 300 in electrical contact with the connector 150.

Figure 2C:
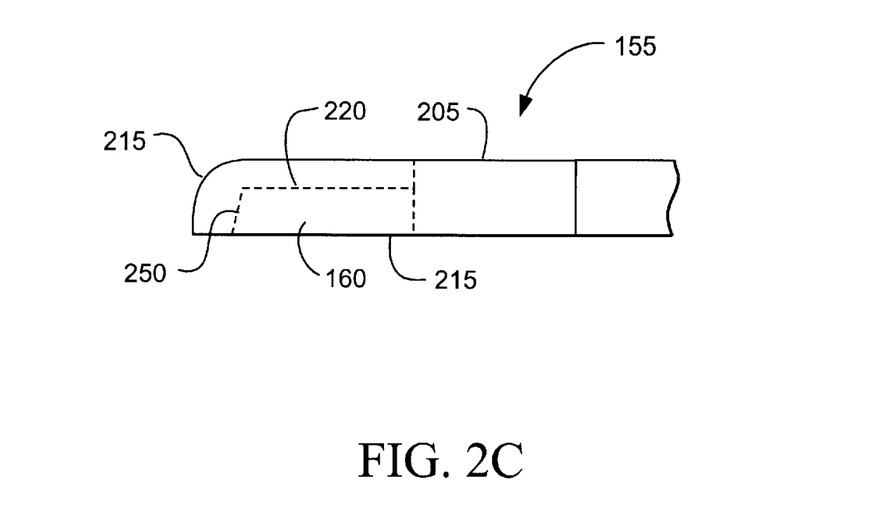
FIG. 2C is a close-up of a connector used with the handheld computer of FIG. 2A.

FIG. 2C a close-up side view of the connector 150 with the individual contact elements 160 shown in phantom behind the extensions 215 of the insulative body 155. The bottom contact surface 250 of each contact element 160 extends into the base surface 210 of the insulative body 155 and to the respective top contact surface 220. Similarly, the top contact surface 220 of the contact element 160 extends into the elevated surface 205 of the insulative body 155 in horizontal alignment with the back face 112 of the handheld computer 100. The bottom contact surface 250 is preferably dimensioned to be shorter than the top contact surface 220 to adapt the connector 150 for mating with pogo style connector elements. The resulting connector elements 160 are "L-shaped", although other shapes or also possible.

FIG. 3 illustrates a pogo connector 300 for use with an embodiment of the present invention. The pogo connector 300 includes a plurality of connector elements 310, each of which may be shaped as circular shaped extensions. Each connector element 310 of the pogo style connector 300 is spring-biased when moved inwards. The pogo style connector 300 is adapted to connect with the connector 150 by securing the engagement members 380, 382 into the openings 270, 272 of the output port. The spring-biased levers 390, 392 extend outward from the engagement members 380,382 to fit into the respective opening 270, 272 of the connector 150 and secure the pogo connector 300 with the handheld computer 100. In this way, the connector elements 310 of the pogo connector 300 are securely maintained in contact with the corresponding contact element 160 of the connector 150. The pogo connector 300 may be disengaged from the handheld computer 100 by biasing the levers 390,392 inwards so that the engagement members 380, 382 can slide out of the insulative body 155.

One advantage provided by pogo connectors 300 is that they enable the accessory device to be relatively small and portable. An example of an accessory device that uses a pogo connector 300 includes a travel companion that plugs into an electrical socket and uses the pogo connector 300 to recharge batteries in the handheld computer 100.

Figure 4A:
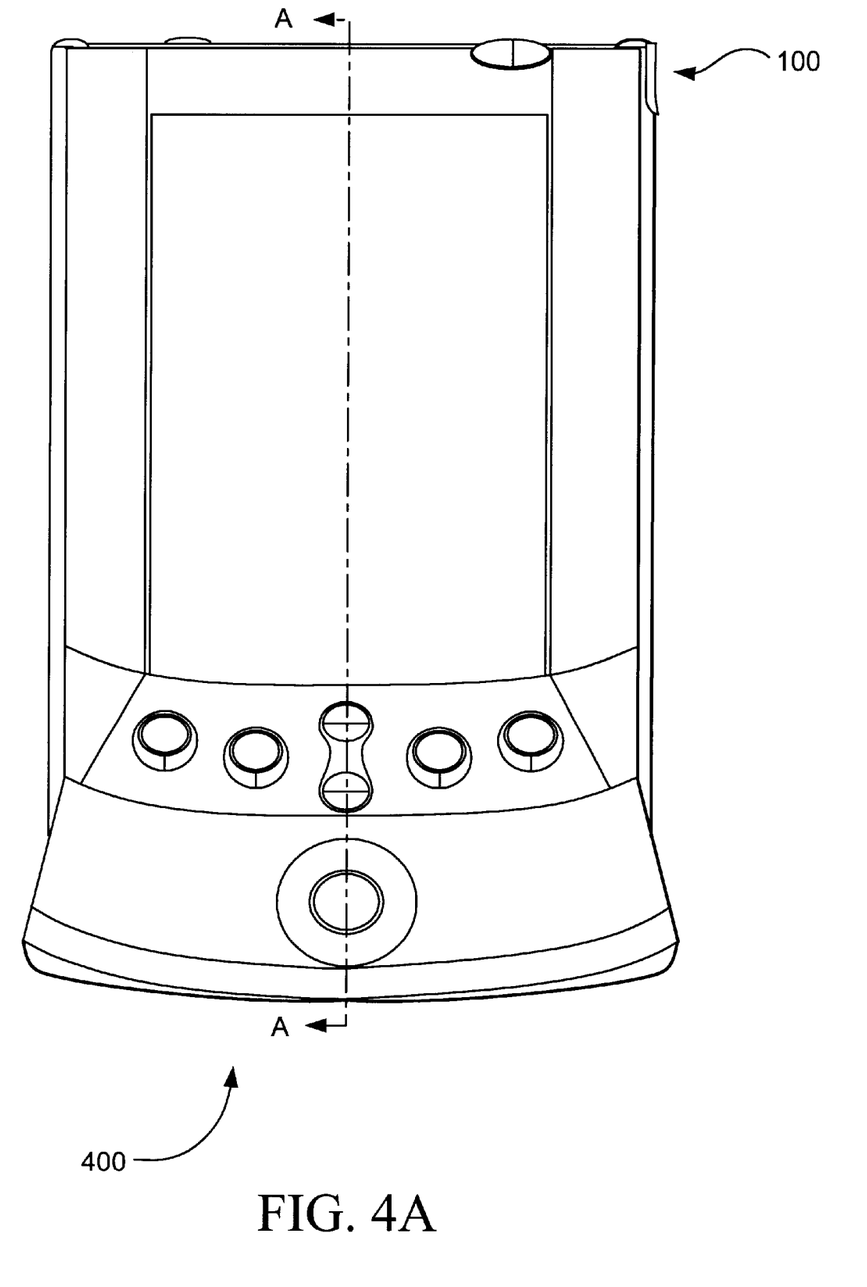
FIG. 4A is a front view of the handheld computer coupled to a cradle.
Figure 4B:
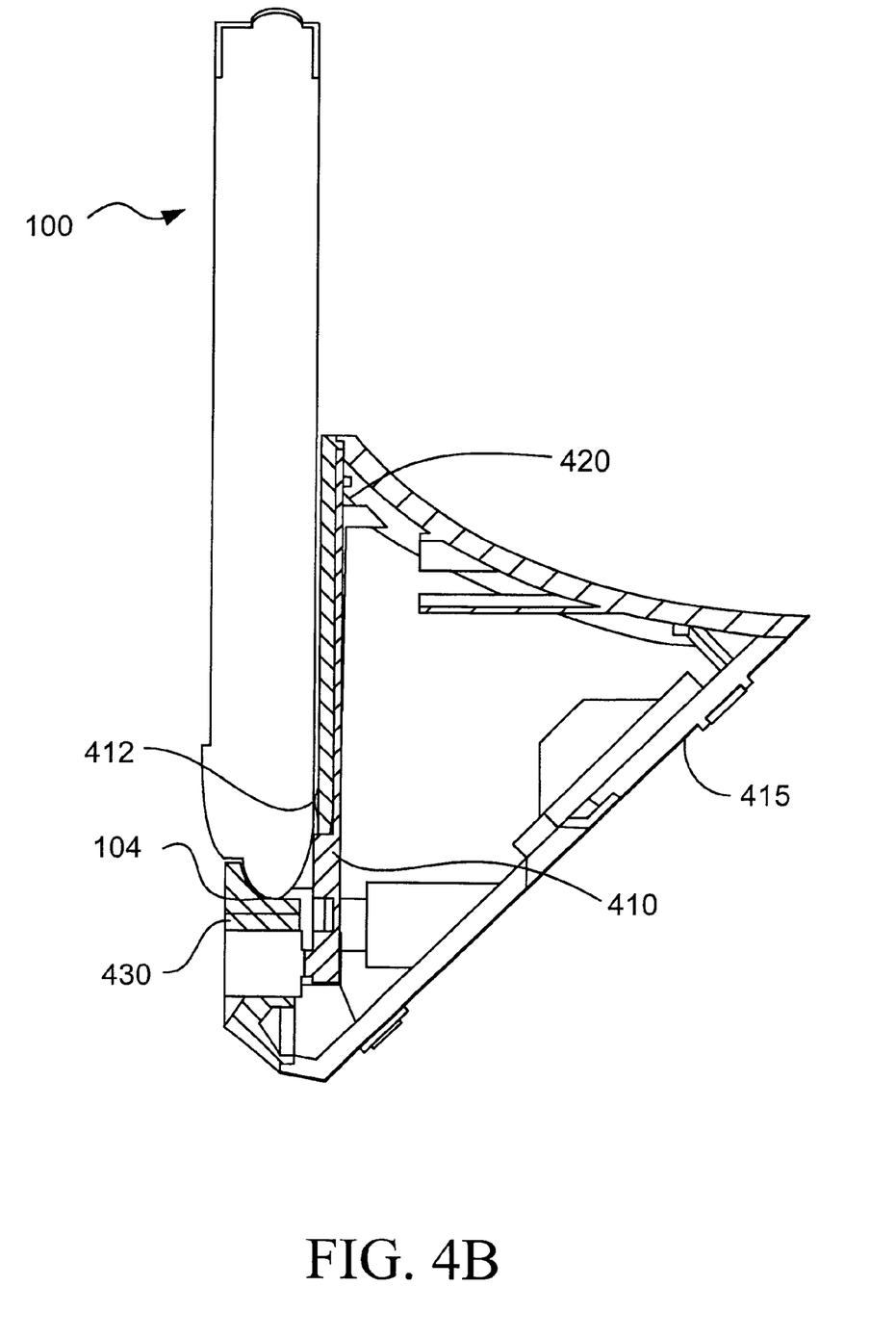
FIG. 4B is a side view of FIG. 4A, showing the handheld computer mating with a wiping style connector of the communication cradle.

With reference to FIGS. 4A and 4B, the handheld computer 100 is mated with a communication cradle 400 using a wiping style connector 410. The cradle 400 may be used as a docking station, and may facilitate connecting the handheld computer 100 to a desktop computer or network. FIG. 4B illustrates that the cradle 400 includes a base 415 that rests on a platform or floor. The cradle 400 includes a tilted front face 420 that merges into a ledge 430. The ledge 430 supports the handheld computer 100 from the bottom edge 104. The tilt of the front face 420 combined with the support of the ledge 430 serves to retain the handheld computer 100 on the cradle 400. The front face 420 accesses the wiping style connector 410 through an opening (not shown). The wiping style connector 410 contacts the top surface 220 of connector 150 as the handheld computer 100 rests on the ledge 430 and against the tilted front face 420. The wiping style 410 connector may protrude or be accessed from an opening above the ledge 430 and may bias inwards when contacted by the top surface 220 of the connector 150. In this way, the connector 150 of the handheld computer 100 is aligned to rest against the front face 420 so that the top surface 220 of the connector 150 is in alignment with the wiping style connector 410.

With reference to FIG. 4B, elements 412 of the wiping style connector 410 are bent and biased so as to slide across the top contact surface 220 (FIGS. 2A–2C) of the connector 150. In an embodiment, elements of the wiping style connector 410 wipe across the top contact surface 420 of the corresponding contact elements when the handheld computer 100 is moved into position along the front face 420 of the cradle 400. For example, the PalmPilot communication cradle manufactured by the 3Com Corp. utilizes wiping style connectors in the manner described above. Embodiments of the invention are available for such cradles, as well as other styled cradles mentioned below.

Alternative Embodiments

Alternative embodiments of this invention may provide for the top contact surface and the bottom surface to be aligned acutely with respect to one another. While both top and bottom surfaces have been described as being planar, other embodiments may also provide for contoured or shaped contact surfaces. For example, the bottom contact surface 250 shown in FIGS. 2A–2C may include a divot centrally positioned for receiving one of the elements 310 of a pogo style connector.

While FIG. 4B illustrates a communication cradle having wiping style connectors, alternative cradles for use with the handheld computer 100 may employ pogo style connectors. The handheld computer 100 may then be dimensioned, shaped, or may position the connector 150 for a pogo style connector on the cradle. For example, the cradle may mount the connector on a ledge that directs the pogo contact elements vertically with respect to the handheld computer, rather than the front face of the cradle. The handheld computer is then aligned to rest over the ledge of the cradle, with the connector 150 aligned to contact the pogo connector of the cradle. An example of this arrangement using pogo style connectors is found on Nino™ personal companion and matching cradle, manufactured by the Philips Corp. Embodiments of the present invention may accommodate either kinds of connectors, thereby increasing the flexibility of the output port and the handheld computer 100 as a whole.

The foregoing description of various embodiments of the invention have been presented for purposes of illustration and description. It is not intended to limit the invention to the precise forms disclosed. Many modifications and equivalent arrangements will be apparent.

What is claimed is:

1. A handheld computer, comprising:

a housing having a front face, a back face, a top surface and a bottom surface; and an electrical connector positioned on a portion of the back face and on a portion of the bottom surface, the connector having a plurality of conductive elements, each of the conductive elements including a first portion positioned on the bottom surface and a second portion extending from the first portion and positioned on the back face, first portions of the conductive elements being oriented to mate with first contacts of a first style connector positioned to oppose the bottom surface, and second portions of the conductive elements aligned to mate with second contacts of a second style connector positioned adjacent to the back face of the handheld computer; and an insulative structure including a plurality of insulative extensions, each of the insulative extensions positioned between a pair of adjacent conductive elements in the plurality of conductive elements to extend a first surface between the first portions of each of the pair of adjacent conductive elements, and a second surface between second portions of each of the pair of adjacent conductive elements, the insulative structure further including a pair of apertures for coupling to the first style connector, the pair of apertures being positioned to laterally oppose one another across the plurality of conductive elements, each of the apertures being adapted to receive and secure to a spring-biased coupling of the first style connector so that each of the first contacts mates with each corresponding first portion of he plurality of conductive elements.

2. The handheld computer of claim 1, wherein the first portion and the second portion of each conductive element are orthogonal to each other.

3. The handheld computer of claim 1, wherein the first portion of each conductive element is adapted to mate with a pogo-style connector, and the second portion of each conductive element is adapted to mate with a wiping-style connector.

4. The handheld computer of claim 1, wherein the first portion of each conductive element is parallel to at least a portion of the bottom surface of the handheld computer, and wherein the second portion of each conductive element is parallel to at least a portion of the back face for the handheld computer.

5. The handheld computer of claim 4, wherein the first portion and the second portion of each conductive element are planar in shape.

6. The handheld computer of claim 4, wherein the first portion of each conductive element is contoured.

7. The handheld computer of claim 1, further comprising a processor retained within the housing.

8. The handheld computer of claim 7, further comprising a display and a plurality of input buttons for interacting with a user of the handheld computer.

* * * * *